Patented Apr. 19, 1938

2,114,576

UNITED STATES PATENT OFFICE 2,114,576

TREATMENT OF CONTAMINATED WATER

Edward P. Schinman, New York, N. Y., assignor to The Permutit Company, New York, N. Y., a corporation of Delaware No Drawing. Application November 24, 1936, Serial No. 112,611

6 Claims. (Cl. 210—11)

This invention relates to treatment of contaminated water; and it comprises a process of purifying water used under contaminating conditions wherein the contaminated water is clarified, purified and filtered by establishing a cyclic flow of the water from the zone of contamination through a granular filter bed of alkaline earth carbonate back to the zone of contamination and adding to the flow at a point ahead of the filter a soluble metal salt reacting with basic compounds to produce a hydrated gel oxide acting as a coagulant for impurities in the water, the water being clarified by the formation of the hydrated metal oxide coagulant therein and the basicity of the water with the accompanying coagulation being maintained by contact with the basic material of the filter; all as more fully hereinafter set forth and as claimed.

In water purification, it is an old and well understood operation to effect a clarification carrying down suspended matter of all kinds by production in the water of flocs of a hydrated metal oxide in gel form. In so doing, bacterial contamination is largely reduced; bacteria and other organisms being carried down by the gel. Most frequently, the hydrated oxide is alumina produced by an addition of sulfate of alumina or aluminate of soda; this depending on whether the water is basic in nature or acid. The basicity due to the presence of temporary hardness (calcium carbonate and magnesium carbonate) is sufficient to give a good floc even with waters which are only of moderate hardness. Sometimes, instead of using alum, ferric sulfate or ferric chloride is used. Occasionally, a pickle liquor containing ferrous sulfate or ferrous chloride is used for this purpose; the oxygen in the water serving to oxidize ferrous to ferric iron and to produce the desired sesquioxid gel. In using aluminum sulfate, which is termed "alum", the calcium carbonate in the water enters into reaction with the alum, forming calcium sulfate, hydrated alumina and $CO_2$. This action only goes on to the extent that calcium carbonate is present. But, as stated, for ordinary purposes, there is enough hardness in most waters to give sufficient flocculation with sulfate of alumina.

In handling swimming pool waters, which are subjected to repeated and continued contamination, it is mostly necessary as a practical procedure to establish a cyclic circulation of the water through outside filters intended to get rid of miscellaneous dirt picked up in the pool. The usual purifying equipment includes a sand filter which takes out coarse impurities but does not remove microorganisms to any great extent unless operated slowly. It is in practice desirable to supplement the action of the filter by such a clarifying treatment as described above, but the difficulty arises that repeated treatments with alum are ineffective after the basicity in the water is destroyed; the natural hardness of any water corresponds to only a small dosage of alum. When a soluble base such as soda is used to supply basicity, it has to be measured exactly and the water becomes soft. The presence of an excess of soda gives a peptizing action on clay and dirt which is undesirable in a swimming pool.

Where a clear and colorless water is wanted, as in swimming pools, the presence of hardness in the water is desirable, hard water having little tendency to become muddy or cloudy and little tendency to take up color giving organics. Clay and like mineral matters do not give a permanent muddiness to hard water. A wholly soft water has a much greater tendency to become muddy or turbid or dark colored and a softened water, containing sodium carbonate, has an active peptizing influence on clay and miscellaneous dirt.

In the present invention water which is subjected to repeated or continuous contamination, such as swimming pool water, is treated with a hardening agent serving also as a filtration medium and with a coagulating agent. So doing, I not only take advantage of the flocculating effect of hardness in the water but also combine with it the coagulating action of alum reacting with hardness and, at the same time, I consolidate filtration with the hardening action. I establish a cyclic flow of water from the swimming pool through a calcium carbonate filter back to the swimming pool and add alum to the flow ahead of the filter and in the quantity required to produce sufficient hydrated alumina to effect coagulation of the impurities in the swimming pool water, including bacteria. The result is a clarified swimming pool water approaching sterility. The bacterial count is brought down to a small figure. The treatment of the water can be made to offset its contamination and treatment can be coordinated with the contamination. When the swimming pool is crowded the cyclic flow can be increased in volume and the addition of alum concomitantly increased. For practical purposes, as I have found, the filtration through a granular bed of calcium carbonate following the alum coagulation treatment puts sufficient hardness in the water flow to maintain the coagulating action of the alum. The hardness maintained in the water keeps it colorless and improves its appearance.

For a filter bed intended to maintain basicity, I have found calcium carbonate most advantageous. Natural limestones and marbles can be used in granular form and have sufficient solubility in water for the present purpose of imparting adequate calcium carbonate basicity. In any case, the rate of solution of the calcium carbonate is directly proportional to the increase of acidity or decrease of basicity effected by the alum addition. A dolomitic limestone can be used, or magnesite (magnesium carbonate).

Using alum addition and a calcite filter there is a formation of calcium sulphate, and with dolomite, of soluble magnesium sulphate as well but neither accumulates beyond a negligible extent. Accumulation is kept down by the natural loss of water from the swimming pool which is made up by addition of raw water. And the use of magnesium limestone, or of magnesite itself, as filtering material is permissible. Barium carbonate (witherite) or strontium carbonate may be used but neither has any particular advantage. Calcium carbonate has the advantages due to ready availability and to the comparative insolubility of calcium sulphate.

While alum is generally used as the agent for coagulation, the usual substitutes such as ferric sulphate or chloride, or ferrous sulphate may be used. Any acid reacting salt forming a hydrated gel oxide by reaction with basicity in the water, is suitable.

In a specific embodiment of the invention I treated swimming pool water containing 96 parts per million of total alkalinity expressed as $CaCO_3$ and measured by an acid titration with methyl orange as indicator. The water contained also 5 to 6 parts free $CO_2$ per million. The water was pumped from the pool through two filters in parallel and downwardly. The filters were 48 inches in diameter. The flow rate through each filter was between 40 and 50 gallons per minute.

No. 1 filter contained a white limestone ground to a fineness of 4 to 40 mesh size. The limestone was substantially pure calcite. No. 2 filter contained a gray dolomitic limestone ground to the same mesh size as No. 1. This No. 2 limestone contained 25 per cent of magnesium carbonate. An alum solution was added to the water at the pump suction and this alum addition reduced the alkalinity of the water from 96 to 48 parts per million and increased the free $CO_2$ in the water to 36 parts per million. Some time after the alum dosage the inlets and outlets of the two filters gave the following analytical tests:

|  | Alkalinity | Free $CO_2$ | pH value |
|---|---|---|---|
|  |  | P. p. m. |  |
| No. 1 filter inlet | 64 | 18 | 7.2 |
| No. 1 filter outlet | 68 | 16 | 7.4 |
| No. 2 filter inlet | 67 | 17 | 7.2 |
| No. 2 filter outlet | 73 | 15 | 7.6 |

This water treatment was continued while the pool was in use and the water in the pool remained clear and clean and sparkling. The contamination due to use of the swimming pool was overcome by the cyclic treatment. It was found as a result of the tests that No. 2 filter, containing the gray limestone, added more basicity to the water than No. 1 filter containing the white pure calcite. The filters were cleaned from time to time in the usual way by backwashing.

In most cases the cyclic filtration through the basic filter with alum coagulation keeps a swimming pool clean and safe. Should further or complete sterilization of the water be required or desired, this can be effected advantageously by a chloramine treatment of the filtered water according to an invention of others. In this treatment the filter effluent is given a feed of ammonia by diversion of a minor portion thereof through a zeolite ammoniator and thence back to the main effluent stream which is thereafter treated with chlorine on the way to the pool. The water filtered according to the present invention requires only a small dosage of chloramine for complete sterilization and this small dosage is regularized and made effective by the minor flow zeolite ammoniation prior to chlorination of the filter effluent on its way back to the swimming pool. The small chloramine dosage obviates the overchlorination which has been objectionable to swimming pool users.

What I claim is:—

1. In purification of water undergoing contamination in use, a process which comprises establishing a cyclic flow of the water from and to the zone of contamination through a filter bed of alkaline earth carbonate in granular form filtering solid impurities from the water and adding to the flow at a point following said contamination and ahead of the filter a metal salt forming in the water a hydrated oxide gel coagulant.

2. In the process of claim 1, filtering the water in cyclic flow after addition of aluminum sulfate thereto through a filter bed of calcium carbonate in granular form imparting alkalinity thereto.

3. In the process of claim 1, adding an iron salt as coagulating agent to the cyclic flow ahead of the basic filter and following contamination.

4. The process of claim 1 wherein the filter bed of alkaline earth carbonate contains magnesium carbonate.

5. In operating a swimming pool, a process of overcoming contamination which comprises passing a flow of water from the pool through a filter bed of slightly soluble granular basic material, removing solid impurities from the water and putting hardness into the water, adding a coagulating agent to the water at a point between the pool and the filter and returning the filtered hard water to the pool.

6. A process of purifying swimming pool water which comprises withdrawing water from the pool, adding alum thereto, filtering the water through a filtering bed of granular calcium carbonate removing coagulated impurities from the water and returning filtered water containing carbonate hardness to the pool.

EDWARD P. SCHINMAN.